United States Patent [19]

Dick et al.

[11] Patent Number: 5,462,496

[45] Date of Patent: Oct. 31, 1995

[54] CLUTCH ACTUATING DEVICE FOR USE IN A VEHICLE DRIVETRAIN SUBASSEMBLY

[75] Inventors: Wesley M. Dick, Fort Wayne, Ind.; David C. Reuter, Saline, Mich.; Joseph A. Dick, Fort Wayne, Ind.

[73] Assignee: Dana Corporation, Toledo, Ohio

[21] Appl. No.: 273,722

[22] Filed: Jul. 12, 1994

[51] Int. Cl.$^6$ ..................................... F16H 37/06
[52] U.S. Cl. .......................... 475/204; 475/206; 180/248; 192/35
[58] Field of Search ..................... 475/150, 198, 475/204, 206; 180/247, 248, 249, 251; 192/35

[56] References Cited

U.S. PATENT DOCUMENTS

| | | | |
|---|---|---|---|
| 872,062 | 11/1907 | Hilliard | 192/70.11 |
| 880,664 | 3/1908 | Hilliard | 192/70.2 |
| 2,008,967 | 7/1935 | Rossmann | 192/35 |
| 2,061,787 | 11/1936 | Warner | 192/40 |
| 2,072,832 | 3/1937 | Weydell | 192/3.56 |
| 2,623,619 | 12/1952 | Clerk | 192/35 |
| 3,724,619 | 4/1973 | Miller | 192/18 |
| 4,645,049 | 2/1987 | Matsuda et al. | 192/35 |
| 4,677,877 | 7/1987 | Anderson et al. | 475/154 |
| 4,738,163 | 4/1988 | Anderson et al. | 475/321 |
| 4,753,330 | 6/1988 | Ohzono et al. | 192/48.4 |
| 4,966,267 | 10/1990 | Carlton | 192/48.91 |
| 4,976,347 | 12/1990 | Sakakibara et al. | 192/20 |
| 5,083,986 | 1/1992 | Teraoka et al. | 475/86 |
| 5,199,325 | 4/1993 | Reuter et al. | 74/861 |
| 5,271,478 | 12/1993 | Kameda et al. | 180/247 |
| 5,380,255 | 1/1995 | Brissenden et al. | 475/204 |

OTHER PUBLICATIONS

U.S. patent application by Dick, in its entirety, having S/N 08/273,644, filed Jul. 12, 1994 entitled "Clutch Actuating Device For Use In A Vehicle Drivetrain Subassembly".

U.S. patent application by Dick, in its entirety, having S/N 08/273,868, filed Jul. 12, 1994 entitled "Clutch Actuating Device For Use in A Vehicle Drivetrain Subassembly".

Primary Examiner—Rodney H. Bonck
Assistant Examiner—Peter Kwon
Attorney, Agent, or Firm—Oldham & Oldham Co.

[57] ABSTRACT

A clutch actuating device for use in a vehicle drivetrain subassembly having a clutch and a rotatable drive member, comprising a first rotating member which is coupled to the drive member and a second rotating member which is free to rotate relative to the drive member. The first and second rotating members are differentially driven by a gear device and may include first and second ramp surfaces which engage one another so as to permit axial translation of the members relative to one another or alternatively, may comprise threaded screw members which engage one another so as to permit axial translation relative to one another. First and second pilot clutches comprising at least one rotatable plate are provided, with at least one of the pilot clutches being connected to the gear device. Pilot clutch activating devices are provided for selectively activating, and thereby selectively grounding, the first and second pilot clutches, wherein activating one of the first and second pilot clutches causes the second rotating member to translate axially relative to the first rotating member so as to load the drivetrain subassembly clutch, and wherein activating the other of the first and second pilot clutches causes the second rotating member to translate axially relative to the first rotating member so as to unload the drivetrain subassembly clutch.

21 Claims, 7 Drawing Sheets

CLUTCH ACTUATING DEVICE FOR USE IN A VEHICLE DRIVETRAIN SUBASSEMBLY

CROSS REFERENCES

This application is related in subject matter to commonly assigned and concurrently filed U.S. Patent Applications having Ser. Nos. 08/273,644 and 08/273,868 (Attorney Docket Nos. 5894-W and 5894-DD).

BACKGROUND OF THE INVENTION

The present invention relates generally to a clutch actuating device and, more particularly, to a clutch actuating device for use in a vehicle drivetrain subassembly.

Four-wheel drive systems for vehicles are being utilized to a greater extent, providing increased traction and safety of operation for the vehicle, particularly during inclement weather conditions or off highway conditions as compared to that provided by conventional two-wheel drive systems. Four-wheel drive systems typically include a torque transfer case which includes an input shaft connected to and driven by the output shaft of the main transmission, a rear output shaft connected to drive the rear wheels of the vehicle, a front output shaft connected to drive the front wheels of the vehicle, and means for drivingly connecting the input shaft to the front and rear output shafts.

In a known four-wheel drive system, characterized as a "part-time" system, a direct drive connection is provided between the front and rear output shafts of the transfer case when the vehicle is operated in a four-wheel drive mode. Such a direct drive connection does not permit the transfer case to accommodate different front and rear wheel speeds which can occur when turning the vehicle. Accordingly, the four-wheel drive mode is generally used only on a "part-time" basis, such as when lower friction road surface conditions, such as wet or snow covered pavement, may require increased traction capabilities. Consequently, the system may operate in either a two-wheel drive mode, a four-wheel drive mode or an "on-demand" four-wheel drive mode. A four-wheel drive clutch provides the direct drive connection between the front and rear output shafts of the transfer case. The four-wheel drive clutch is actuated using a rotary electric motor and an associated gear reduction mechanism which is required to provide the relatively high torque requirements necessary to bias the four-wheel drive clutch. While the aforementioned four-wheel drive clutch actuation system may be advantageously used in many applications, automotive design engineers are continually seeking to simplify, and consequently reduce the cost of, vehicle drivetrain systems.

SUMMARY OF THE INVENTION

The present invention is therefore directed to a clutch actuating device for use in a vehicle drivetrain subassembly having a clutch. According to a preferred embodiment of the present invention, the clutch actuating device comprises a first rotating member which is coupled to a drive member of the vehicle drivetrain subassembly for rotation therewith and a second rotating member which is free to rotate relative to the drive member. The first and second rotating members are engaged to cause axial translation of the second member relative to the first member and are differentially driven by a gear means connected to at least one of the rotating members. The actuating device further includes first and second pilot clutches, each having at least one rotatable plate, with at least one of the first and second pilot clutches being connected to the gear means. The device further comprises means for selectively activating, thereby selectively grounding, the first and second pilot clutches, wherein activating one of the first and second pilot clutches causes the second rotating member to translate axially relative to the first rotating member so as to load the drivetrain subassembly clutch, and wherein activating the other of the first and second pilot clutches causes the second rotating member to translate axially relative to the first rotating member so as to unload the drivetrain subassembly clutch.

A main advantage of the clutch actuating device of the present invention is that the force required by the operator or control means to actuate the vehicle drivetrain subassembly clutch is significantly smaller than with previous devices since most of the clutch actuation energy is provided by a rotating drive member of the drivetrain subassembly, thereby affording a simplified and cost reduced clutch actuation device.

BRIEF DESCRIPTION OF THE DRAWINGS

The aforementioned advantage, as well as other advantages of the present invention, will become apparent from the subsequent detailed description of the preferred embodiments when taken in conjunction with the accompanying drawings, wherein.

DETAILED DESCRIPTION

Figure 1:
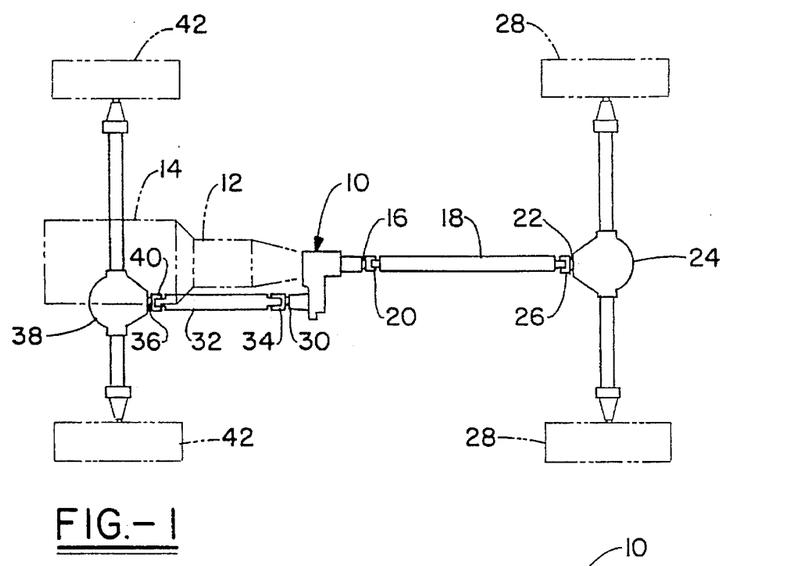
FIG. 1 is a top plan view illustrating a four-wheel drive system which may incorporate the clutch actuating device of the present invention.

Referring now to the drawings, FIG. 1 schematically illustrates a four-wheel drive system which includes a torque transfer case 10 which incorporates the clutch actuating device (not shown in FIG. 1) of the present invention. As shown in FIG. 1, torque transfer case 10 is coupled with a conventional transmission unit 12 which in turn is coupled to a vehicle drive engine 14. Transfer case 10 includes a rear output shaft or yoke 16 connected to the forward end of a rear drive shaft 18 by means of a conventional universal joint coupling 20. The rearward end of the drive shaft 18 is coupled to an input shaft or yoke 22 of a rear differential 24 by means of a universal joint coupling 26. The rear differential 24 is adapted to divide torque from the rear drive shaft 18 between the rear wheels 28 of the vehicle.

Transfer case 10 is also provided with a front output shaft or yoke 30 which is drivingly connected to the rearward end of a vehicle front drive shaft 32 by means of a universal joint coupling 34. The front drive shaft 32 has a forward end connected to an input shaft or yoke 36 of a vehicle front differential unit 38 by means of a universal joint coupling 40 and is adapted to divide torque received from drive shaft 32 between the vehicle front wheels 42.

Figure 2:
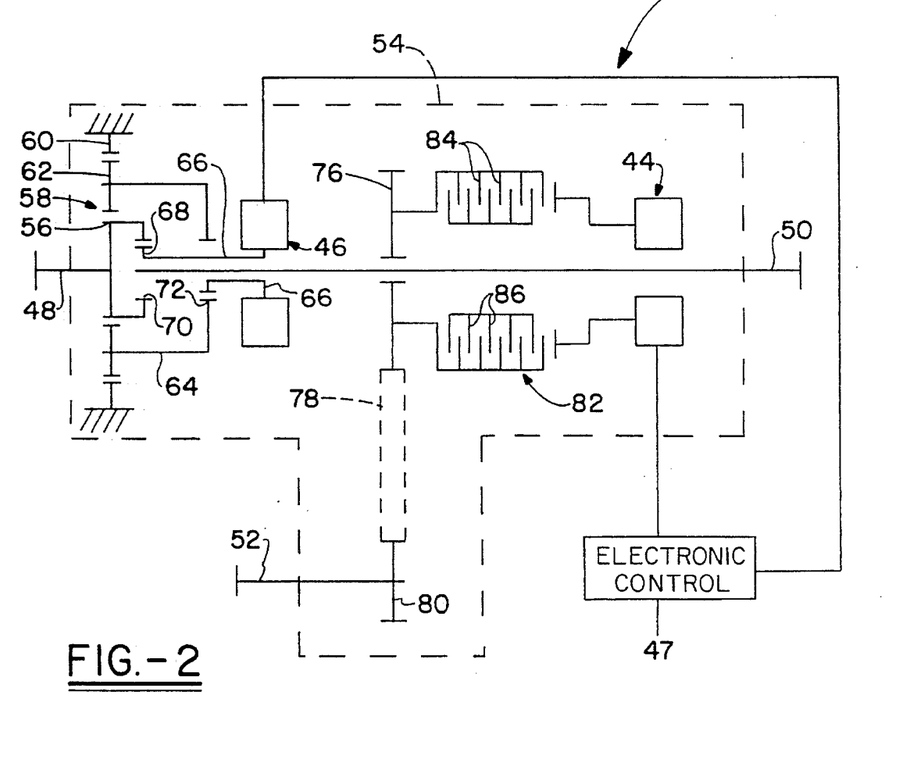
FIG. 2 is a schematic diagram illustrating one example of a torque transfer case which can incorporate the clutch actuating device of the present invention.

Referring now to FIG. 2, there is shown a schematic diagram of the internal components of the transfer case 10 of FIG. 1, which incorporates a clutch actuation device, generally indicated at 44. Transfer case 10 further includes an electric range shift actuator, generally indicated at 46 which may be used in conjunction with a microprocessor-based electronic control system 47 to shift the transfer case 10 between high range, neutral and low range operating modes, as discussed in greater detail in U.S. Pat. No. 5,199,325 issued Apr. 6, 1993, which is herein expressly incorporated by reference. As shown in FIG. 2, the transfer case 10 includes an input shaft 48 coupled to the output shaft of the vehicle transmission 12 (shown in FIG. 1), a rear output shaft 50 for connection to the vehicle rear drive shaft 18, and a front output shaft 52 for connection to the vehicle front drive shaft 32.

The input shaft 48 is rotatably supported at the forward end of a transfer case housing 54 and incorporates a sun gear 56 which forms part of a planetary gear reduction assembly, generally indicated at 58, used to achieve the low gear operating range. Planetary assembly 58 includes a ring gear 60 which is fixed relative to housing 54, and a plurality of circumferentially spaced planet gears 62 which are individually rotatably supported by planet carrier 64. Rear output shaft 50 extends forwardly into housing 54 and carries at its forward end an axially movable range shift sleeve 66 having external splines 68 for engagement with either internal splines 70 connected to the input shaft 48, or internal splines 72 connected to the planet carrier 64. When range shift sleeve 66 is connected to the input shaft 48, as illustrated above axis 74 in FIG. 4, there is a direct drive connection between input shaft 48 and the rear output shaft 50 to define the high speed range. When shift sleeve 66 is connected to planet carrier 64, as shown below axis 74 in FIG. 4, the planetary gear assembly 58 introduces a predetermined gear reduction to define the low speed range. When shift sleeve 66 is located at an intermediate position (not shown) between the input shaft splines 70 and the planet carrier splines 72, transfer case 10 is in neutral. The specific construction and known operation of range shift sleeve 66 is discussed in greater detail in U.S. Pat. No. 5,199,325.

The transfer case 10 further comprises a first drive sprocket 76 which is rotatably supported on a central portion of the rear output shaft 50 and is connected by a drive chain 78 to drive a second drive sprocket 80 which is rotatably supported within transfer case housing 54 and connected to drive the front output shaft 52. A multi-disc four-wheel drive clutch, generally indicated at 82, is provided to control torque input to the front output shaft 52, and includes a first group of clutch plates 84 which, while axially movable, are secured for rotation with the first drive sprocket 76. A second group of clutch plates 86 are secured for rotation with the rear output shaft 50, and are also axially movable. Four-wheel drive clutch 82 is actuated by clutch actuating device 44, as subsequently discussed in greater detail. When clutch 82 is disengaged the vehicle is operated in a two-wheel drive mode, with all the driving torque directed to the rear wheels of the vehicle via output shaft 50, vehicle rear drive shaft 18 and rear differential 24. When clutch 82 is fully engaged, a direct drive connection is provided between rear output shaft 50 and front output shaft 52 so that torque is distributed to the front and rear wheels of the vehicle based upon the traction available at each wheel. The various modes of operation, which may include an auto "on-demand" four-wheel drive mode, are discussed in greater detail in U.S. Pat. No. 5,199,325.

Figure 3:
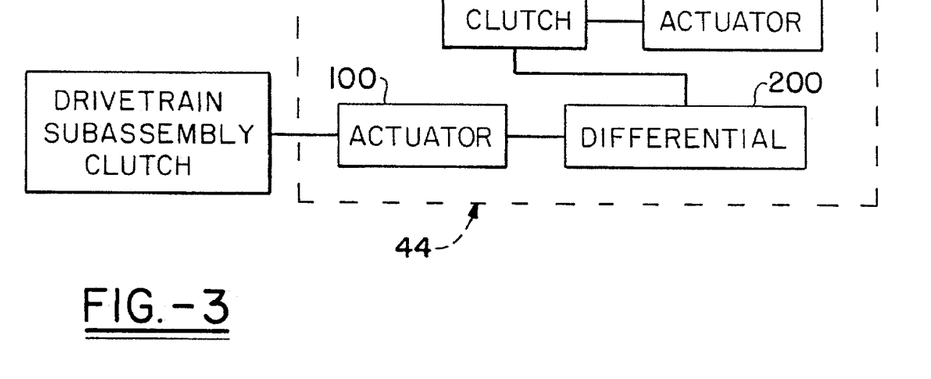
FIG. 3 is a schematic diagram illustrating the sub-systems included in the clutch actuating device of the present invention.

The clutch actuating device of the present invention, which is indicated generally at 44 in FIG. 2, comprises a number of subsystems which are illustrated schematically in FIG. 3 and include the following: an actuator mechanism 100 which comprises a pair of rotating members which are caused to translate axially relative to one another so as to engage or disengage the vehicle drivetrain subassembly clutch; a differential gear means 200 which is used to differentially drive the individual rotating members of the actuator mechanism 100; a pilot clutch means 300 comprising a pair of pilot clutches which are selectively grounded so as to produce the desired relative rotation and the corresponding relative axial translation between the pair of rotating members of actuator mechanism 100; and a pilot clutch activation means 400 which is used to selectively activate individual pilot clutches of pilot clutch means 300. As shown in the subsequently discussed illustrative embodiments of the present invention, the rotating members of actuator mechanism 100 may comprise either threaded screw members or ramp members; the differential gear means 200 may comprise either a planetary gear set or a bevel gear set; the pair of pilot clutches of clutch means 300 may be constructed of a variety of configurations including first and second sets of rotatable disks, first and second sets of slotted rotatable disks, or individual disks; and the pilot clutch activating means 400 may comprise a pair of electromagnets and associated coils or a single electromagnet with concentric coils. Further, the pilot clutch activating means 400 may also comprise mechanical, hydraulic or pneumatic systems. The numerical designations of the various subsystems depicted schematically in FIG. 4 will remain the same throughout each of the subsequently discussed embodiments of the clutch actuating device 44 of the present invention.

Figure 4:
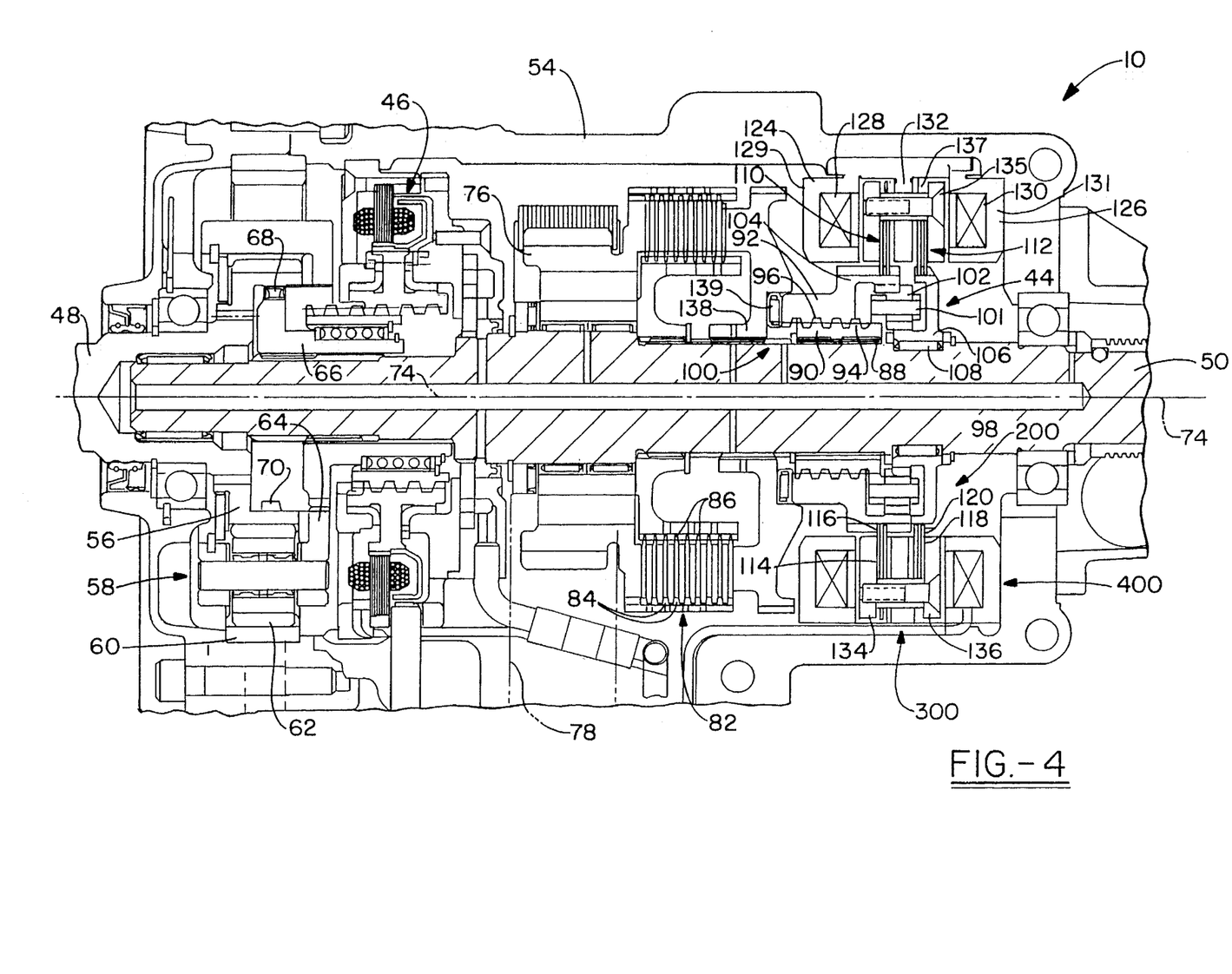
FIG. 4 is a cross-sectional view illustrating a portion of the exemplary torque transfer case of FIG. 2 which incorporates the clutch actuating device according to a preferred embodiment of the present invention.

Referring now to FIG. 4, a torque transfer case 10, comprising an illustrative vehicle drivetrain subassembly, will be discussed with particular attention to the structural features and functions of tile clutch actuating device 44 according to a first preferred embodiment of the present invention. It is noted that the front output shaft and the associated structure of transfer case 10 is not illustrated in FIG. 4. The actuator mechanism 100 of clutch actuating device 44 comprises a first, or inner rotating sleeve member 90 which is connected to output shaft 50 via splines 88, and is therefore coupled to output shaft 50 for rotation therewith. A second or outer rotating sleeve member 92 is disposed in surrounding relationship with inner sleeve member 90. Sleeve members 90 and 92 comprise threaded screw members and member 90 includes external threads 94 which engage internal threads 96 of member 92. Member 92 is free to rotate relative to rear output shaft 50 and engages member 90 in a linear screw arrangement so as to permit axial translation of outer sleeve member 92 relative to inner sleeve member 90 for purposes of loading and unloading clutch 82. The differential gear means 200 comprises a planetary gear set, indicated generally at 98 in FIG. 4. Planetary gear set 98 includes a planet carrier 101 which is grounded to shaft 50 directly or indirectly through attachment to inner sleeve member 90. The outer sleeve member 92 is connected to planetary gear set 98 which drives member 92 relative to member 90. The plurality of circumferentially spaced planet gears 102 are individually rotatably mounted on planet carrier 101. Each of the planet gears 102 meshingly engages a ring gear 1(34 and a sun gear 106. Ring gear 104 is attached to, and may be integrally formed with outer rotating sleeve member 92. Sun gear 106 is rotatably mounted about output shaft 50 via bearing assembly 108, and is therefore free to rotate relative to output shaft 50.

Pilot clutch means 300 of clutch actuating device 44 comprises a first pilot clutch, generally indicated at 110, and a second pilot clutch, generally indicated at 112. Pilot clutch 110 comprises a plurality of annular, rotatable plates 114 which are connected to ring gear 104 via splines 116. Pilot clutch 112 comprises a plurality of annular, rotatable plates 118 which are connected to sun gear 106 via splines 120. A means for selectively activating pilot clutches 110 and 112 so as to selectively ground pilot clutches 110 and 112, is indicated generally at 400 and may comprise electromagnets 124 and 126 having coils 128 and 130, respectively. Coils 128 and 130 are contained within housings 129 and 131, respectively, and are supported by transfer case housing 54. An annular reaction plate 132 is disposed axially between pilot clutches 110 and 112 and is supported by housing 54. Activating means 400 also includes annular armature plates 134 and 136, wherein armature plate 134 is disposed axially between electromagnet 124 and pilot clutch 110 and armature plate 136 is disposed axially between electromagnet 126 and pilot clutch 112. Armature plates 134 and 136 are secured to one another by a plurality of circumferentially spaced screws 135, with each screw being surrounded by a separate spacer or sleeve member 137. Sleeve members 137 are adapted to engage the facing surfaces of armature plates 134 and 136 so as to establish a predetermined spacing between armature plates 134 and 136 and to maintain plates 134 and 136 in a substantially parallel relationship with one another. Additionally, armature plates 134 and 136 are each separated by a suitable air gap from the corresponding coil housing 129 and 131, respectively.

In operation energizing coil 130 of electromagnet 126 attracts armature plate 136 which in turn causes plates 114 of pilot clutch 110 to be compressed between armature plate 134 and reaction plate 132, thereby grounding plates 114 of pilot clutch 110 to transfer case housing 54. Activating pilot clutch 110 so as to ground plates 114 causes relative rotation between ring gear 104 and shaft 50 since rotation of ring gear 104 is prevented or retarded. Consequently, activating pilot clutch 110 also creates relative rotation between outer sleeve member 92 and inner sleeve member 90. Accordingly, activating pilot clutch 110 causes threaded outer sleeve member 92 to translate axially relative to threaded inner sleeve member 90 until member 92 applies a force to pressure plate 138 via contact with thrust bearing 139 which actuates clutch 82 and places transfer case 10 in a four-wheel drive mode of operation. Energizing coil 128 of electromagnet 124 attracts armature plate 134 causing plates 118 of pilot clutch 112 to be compressed between armature plate 136 and reaction plate 132. Accordingly, rotation of sun gear 106 is prevented or retarded which produces an opposite relative rotation between threaded sleeve members 92 and 90, as compared to that produced by activating pilot clutch 110, causing member 92 to translate axially relative to member 90 in a direction away from pressure plate 138 so as to unload or disengage, clutch 82. The linear screw arrangement defined by mating external threads 94 of inner sleeve member 90 and internal threads 96 of outer sleeve member 92 is configured to ensure that outer sleeve member 92 will maintain its axial position until one of the pilot clutches 110 and 112 is activated causing a change in position. The pitch angle and material of the external threads 94 of inner sleeve or screw member 90 and the internal threads 96 of outer sleeve or screw member 92 are selected so that the actuating force applied to clutch 82 will be maintained after pilot clutch 110 has been deactivated. It should be understood that the foregoing discussion corresponds to a given direction of rotation of rear output shaft 50 and a corresponding direction of motion of the associated vehicle (not shown), and that for an opposite direction of rotation of shaft 50 the engaging and disengaging roles of pilot clutches 110 and 112 are reversed, ie. activating pilot clutch 112 causes member 92 to translate axially relative to member 90 so as to contact pressure plate 138 and actuate, or load clutch 82 while activating pilot clutch 110 causes member 92 to translate relative member 90 so as to unload or disengage clutch 82. Activation of pilot clutches in this as well as the other embodiments of the invention may be performed by the electronic control system 47 as an example, or may be activated manually by the vehicle operator.

The main advantage of the clutch actuating device 44 is that the force and energy required by the operator or vehicle control means to engage clutch 82 is much smaller than that of prior devices since most of the actuation energy required is supplied by rotating output shaft 50 on which clutch 82 is mounted. This permits a reduction in cost, size and weight of the included elements of clutch actuating device 44 relative to prior mechanisms. Additionally, finite variable control of clutch torque may be easily and precisely achieved since no overcenter devices are employed as in typical prior ball ramp or other self-energizing clutch actuating devices. Further, although a thrust bearing is incorporated in clutch actuating device 44, the thrust bearing 139 is only loaded during periods when member 92 is in contacting engagement with bearing 139 due to relative rotation between sleeve members 92 and 90, which enhances bearing life relative to thrust bearings which are continuously running when loaded or unloaded.

Figure 5:
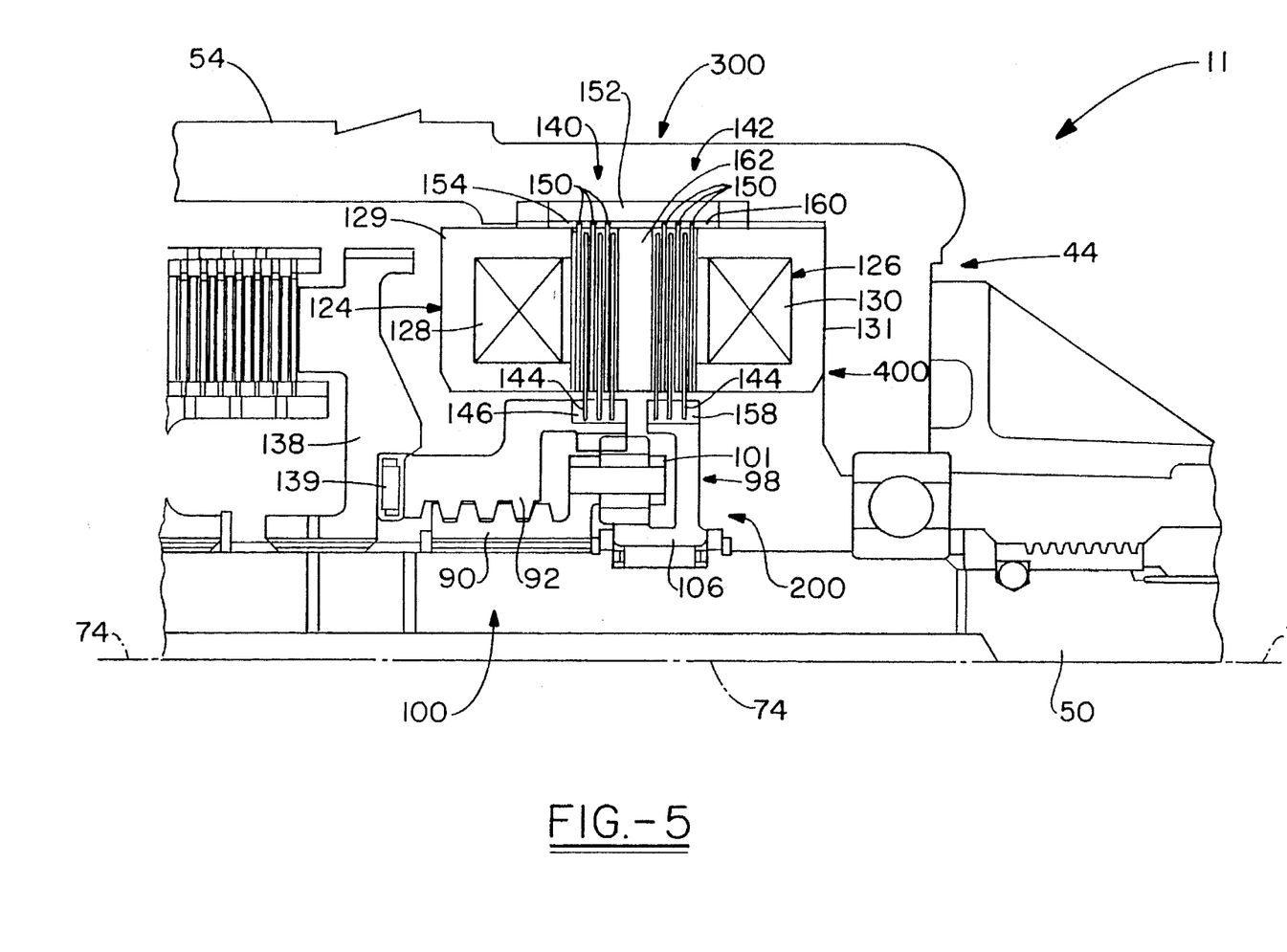
FIG. 5. is a partial cross-sectional view illustrating another torque transfer case incorporating the clutch actuating device according to another preferred embodiment of the present invention, with the portion of the torque transfer case shown being depicted above the rotational centerline of the rear output shaft of the transfer case.
Figure 6:
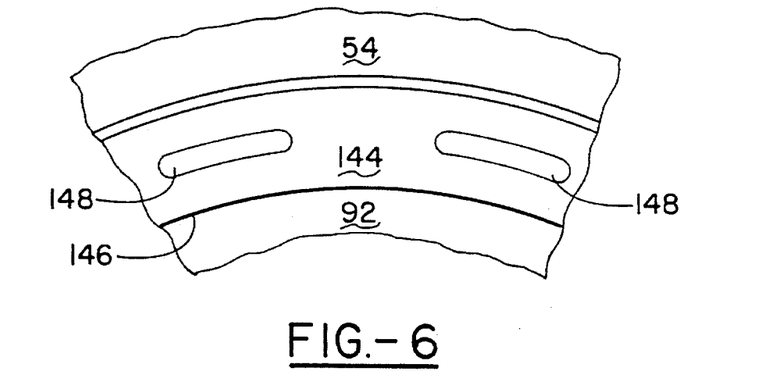
FIG. 6 is a partial transverse sectional view taken along line 6—6 in FIG. 5.
Figure 7:
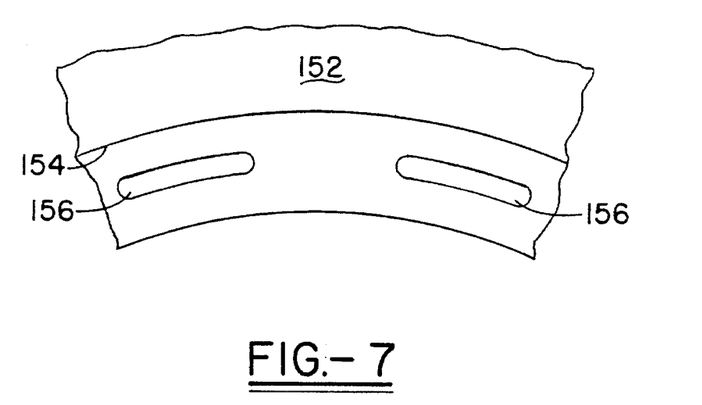
FIG. 7 is a partial transverse sectional view taken along line 7—7 in FIG. 5.

Referring now to FIG. 5 a preferred embodiment of the clutch actuating device 44 of the present invention is illustrated in another torque transfer case 11, wherein FIG. 5 illustrates only a portion of torque transfer case 11 with the portion shown being depicted above the centerline axis 74 of rear output shaft 50. The elements of actuator mechanism 100 and the differential gear means 200 of the embodiment illustrated in FIG. 5 are the same as those illustrated in the embodiment of FIG. 4 and identical reference numerals have been used to indicate common elements. Pilot clutch means 300 and clutch activating means 400 of FIG. 5 differ from those of the embodiment shown in FIG. 4 and are specifically constructed as follows. Pilot clutch means 300 includes a first pilot clutch, indicated generally at 140, and a second pilot clutch, indicated generally at 142. Pilot clutch 140 includes a first set of clutch plates 144 which are attached to outer rotating sleeve member 92 via a splined connection 146. Clutch plates 144 include a plurality of circumferentially spaced and circumferentially extending slots 148, as shown in FIG. 6. Pilot clutch 140 also includes a second set of plates 150 which are connected to stationary support structure 152 of transfer case housing 54 via splined connection 154. As shown in FIG. 7, plates 150 include a plurality of circumferentially spaced and circumferentially extending slots 156. Plates 144 and plates 150 of pilot clutch 140 are interleaved with one another, with each plate 144 being free to rotate about axis 74 of rear output shaft 50 with rotating sleeve member 92 and each plate 150 being grounded to transfer case housing 54.

Pilot clutch 142 also includes a plurality of plates 144 which are connected to an outer portion of sun gear 106 via splined connections 158 and a plurality of plates 150 which are connected to transfer case support structure 152 via splined connections 160. As with pilot clutch 140, plates 144 and 150 of pilot clutch 142 are interleaved with one another. The pilot clutch activating means 400 includes a first electromagnet 124, having a coil 128 contained within housing 129 which is grounded to transfer case housing 54, and a second electromagnet 126 having a coil 130 contained within housing 131 which is also grounded to transfer case housing 54. Unlike the pilot clutch activating means illustrated in the embodiment of FIG. 4, pilot clutch activating means 400 of FIG. 5 does not include first and second armature plates and the associated plurality of screw members and sleeve members shown in FIG. 4. Also, the reaction plate 132 of FIG. 4 is replaced by a floating shield plate 162 which is used in conjunction with clutch plates 144 and 150 as subsequently described.

Slots 148 of plates 144 cooperate with slots 156 of plates 150 such that when either coil 128 or coil 130 is energized, the magnetic field generated will form a flux path which starts at one pole of the corresponding electromagnet 124 or 126, respectively, and travels through corresponding ones of plates 144 and 150 until the field is stopped by floating shield plate 162. The field is then forced to wrap around and return to the opposite pole of the corresponding one of electromagnets 124 and 126. The positioning of slotted plates 144 and 150 in pilot clutches 140 and 142 allows the magnetic fields of electromagnets 124 and 126 to act upon each adjacent pair of plates 144 and 150 separately.

In operation, energizing coil 128 of electromagnet 124 causes adjacent ones of slotted plates 144 and 150 of pilot clutch 140 to be attracted to one another, so as to ground plates 144 to transfer case housing 54. Activating pilot clutch 140 so as to ground plates 144 retards or prevents the rotation of ring gear 104 thereby causing relative rotation between ring gear 104 and shaft 50 and between outer threaded sleeve member 92 and inner threaded sleeve member 90. Accordingly, activating pilot clutch 140 causes member 92 to translate axially relative to member 90 until member 92 applies a force to pressure plate 138 through contact with thrust bearing 139, which in turn loads or engages clutch 82 and places transfer case 11 in a four-wheel drive mode of operation. Energizing coil 130 of electromagnet 126 causes adjacent ones of slotted plates 144 and 150 of the pilot clutch 142 to be attracted to one another, thereby grounding plates 144 of pilot clutch 142 to transfer case housing 54. Accordingly, when pilot clutch 142 is activated so as to ground the plates 144, rotation of sun gear 106 is retarded or prevented which produces an opposite relative rotation between members 92 and 90, as compared to that produced by activating pilot clutch 140, causing member 92 to translate axially relative to member 90 in a direction away from pressure plate 138 so as to unload, or disengage, clutch 82. As with the embodiment of the clutch actuating device illustrated in FIG. 4, the engaging and disengaging roles of pilot clutches 140 and 142 would be reversed for an opposite rotation of shaft 50.

Figure 8:
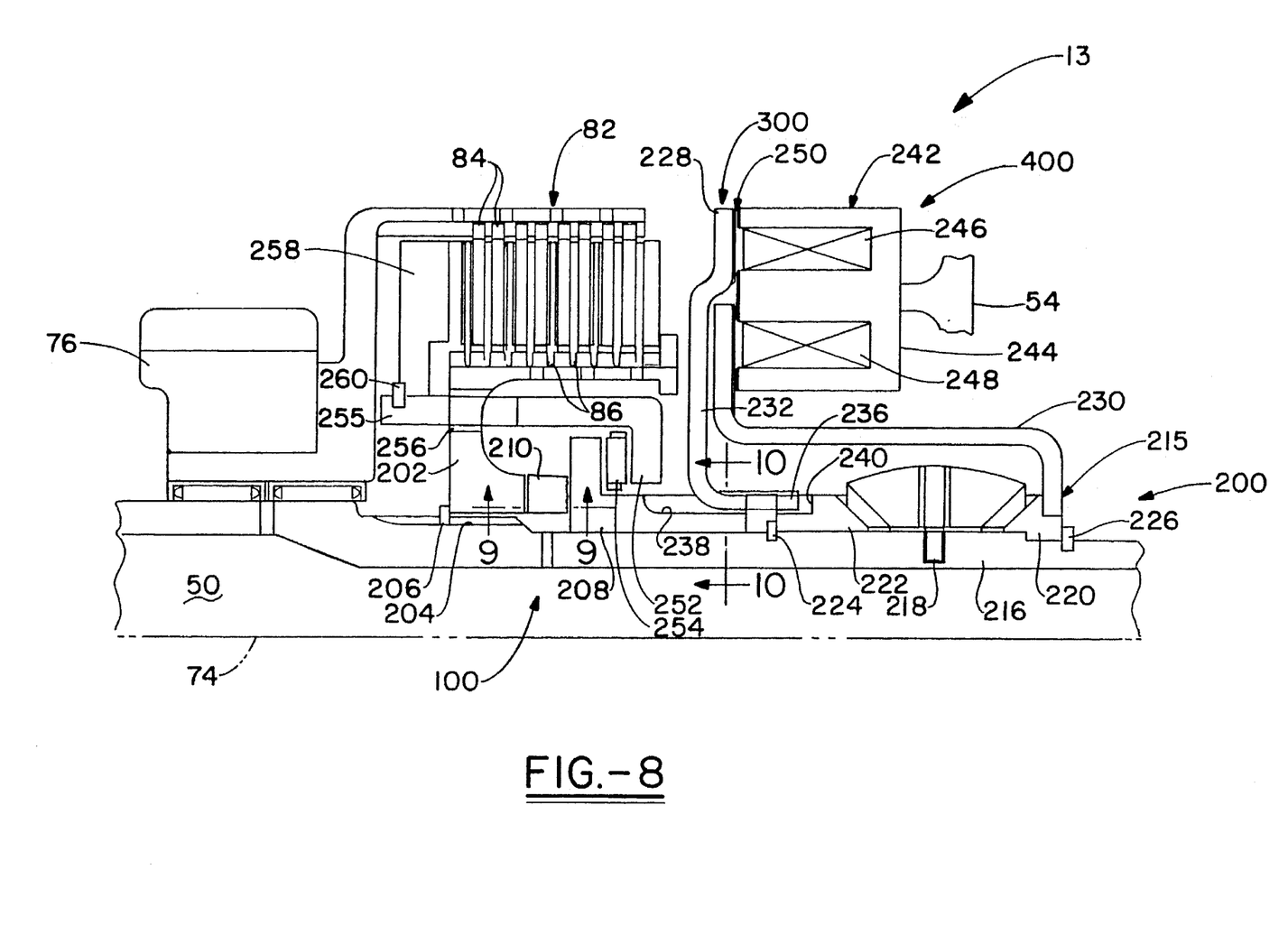
FIG. 8 is a partial cross-sectional view illustrating yet another torque transfer case incorporating the clutch actuating device according to another preferred embodiment of the present invention, with the portion of the transfer case shown being depicted above the rotational centerline of the rear output shaft of the transfer case.

FIG. 8 is a partial cross-sectional view illustrating a portion of another torque transfer case 13 with the portion shown being depicted above centerline axis 74 of rear output shaft 50, which incorporates the clutch actuating device 44 of the present invention according to another preferred embodiment. Transfer case 13 includes four-wheel drive clutch 82 which includes a first set of clutch plates 84 which, while axially moveable, are secured for rotation with drive sprocket 76, which is drivingly connected to a second drive sprocket (not shown in FIG. 8) for driving the front output shaft of transfer case 13 as described in previous embodiments. Clutch 82 further comprises a second set of clutch plates 86 which are secured for rotation with the rear output shaft 50 of transfer case 13, but are also axially moveable. Clutch plates 86 are secured for rotation with output 50 via a splined connection to clutch hub 202 which is connected to shaft 50 via splines 204, for rotation with shaft 50. Clutch hub 202 is prevented from moving in an axially forward direction by snap ring 206 which is secured to shaft 50. Clutch 82 of transfer case 13 is actuated by clutch actuating device 44 as subsequently discussed.

Figures 9, 10, 12:
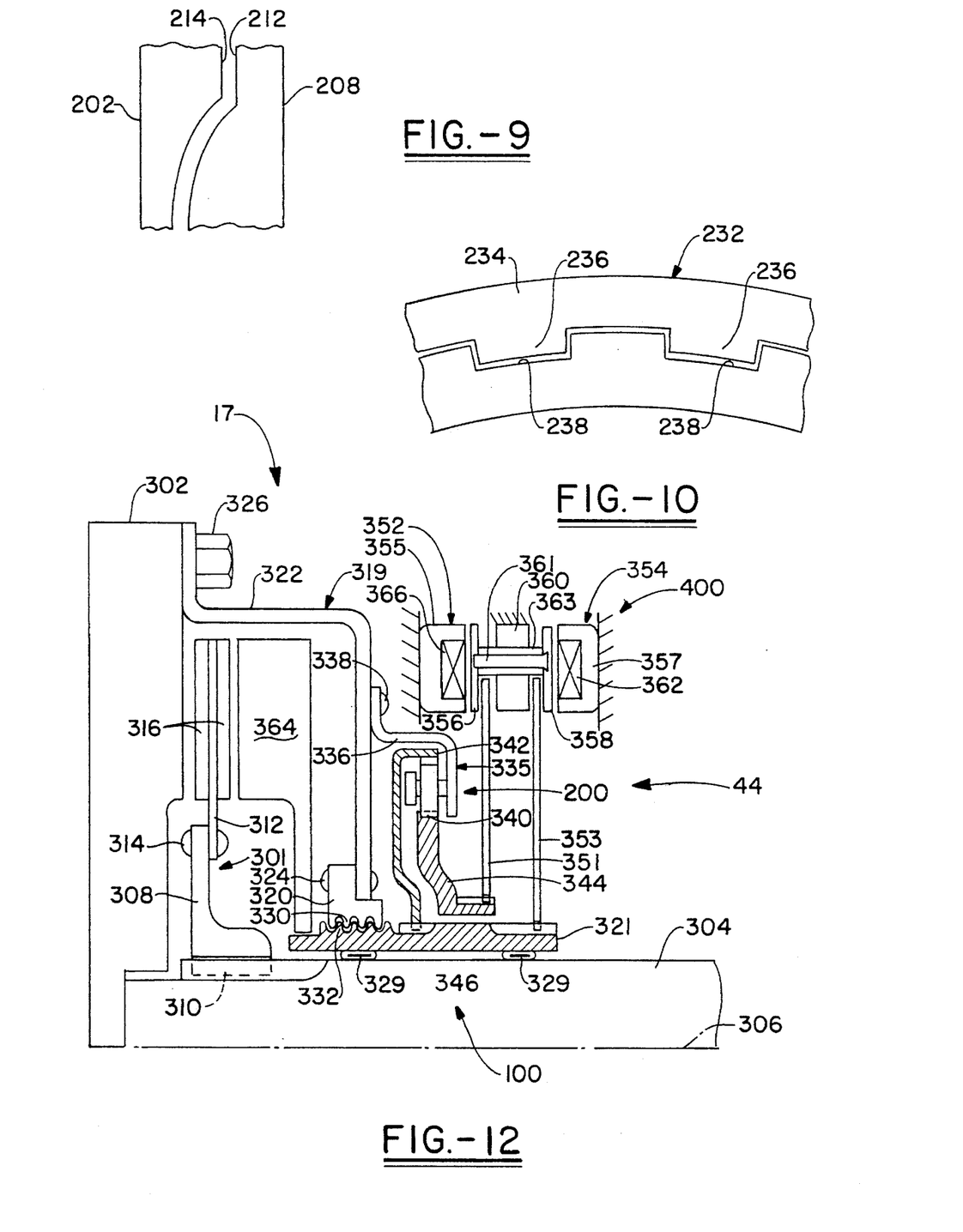
FIG. 9 is a view taken along line 9—9 in FIG. 8 illustrating the single directional ramp surfaces included in the embodiment of the clutch actuating device illustrated in FIG. 8.
FIG. 10 is a partial transverse sectional view taken along line 10—10 in FIG. 8.
FIG. 12 is a cross-sectional view illustrating the clutch actuating device according to yet another preferred embodiment of the present invention for use in conjunction with a primary vehicle clutch.

The actuator mechanism 100 of actuating device 44 comprises rotating sleeve member 208 which is coaxially disposed, in a slip fit, about shaft 50 so that sleeve 208 is free to rotate about shaft 50. Actuator mechanism 100 further includes a second rotating member, comprising clutch hub 202. Rotating sleeve member 208 and clutch hub 202 engage one another so as to permit axial translation of sleeve member 208 relative to clutch hub 202 for the purpose of loading clutch 82 of torque transfer case 13. This axial movement may be accomplished since sleeve member 208 and clutch hub 202 each include a ramp, or cam surface, which engage one another as indicated generally at 210. Sleeve member 208 includes a ramp surface 212 and clutch hub 202 includes a ramp surface 214 with surfaces 212 and 214 engaging one another so as to produce axial translation of sleeve member 208 relative to clutch hub 202 as subsequently discussed. Ramp surfaces 212 and 214 are single directional as illustrated in FIG. 9.

Clutch actuating device 44 further includes a differential gear set 200, comprising a bevel gear set, indicated generally at 215, for differentially driving sleeve member 208 relative to clutch hub 202. Bevel gear set 215 includes a pinion gear 216 which is secured to output shaft 50 of transfer case 10 by one or more pins 218 so that pinion gear 216 rotates with output shaft 50. Bevel gear set 215 further includes a first, aft bevel side gear 220 and a second, forward bevel side gear 222 which each meshingly engage pinion gear 216. Side gears 220 and 222 are mounted in a slip fit about output shaft 50 so that side gears 220 and 222 are free to rotate relative to shaft 50. Snap rings 224 and 226, positioned on the forward side of gear 222 and the aft side of gear 220, respectively, prevent axial displacement of side gears 220 and 222.

Pilot clutch means 300 includes first and second pilot clutches 228 and 230, respectively. Pilot clutch 228 includes an outer, annular disk portion 232 and a plurality of circumferentially spaced and axially extending fingers 236, as shown in FIG. 10, which are attached to the outer disk portion 232, and may be integrally formed with disk portion 232. Axially extending fingers 236 of pilot clutch 228 engage both sleeve member 208 and forward side gear 222, with each finger 236 engaging a slot 238 formed in sleeve member 208 and a corresponding slot 240 formed in forward side gear 222. Slots 238 have an axial length which is sufficient to accommodate the required axial travel of sleeve member 208 for engaging, or loading clutch 82 of transfer case 13. Pilot clutch 230 is drivingly connected to aft bevel side gear 220. Pilot clutch activating means 400 comprises an electromagnet indicated generally at 242. Electromagnet 242 includes a housing 244 which is fixedly attached to housing 54 of transfer case 13. Electromagnet 242 further includes first and second coils 246 and 248, which are concentric with one another. When coils 246 and 248 are de-energized, pilot clutches 228 and 230 are free to rotate with output shaft 50 of transfer case 13. Additionally, bevel side gears 220 and 222 and sleeve member 208 are also free to turn with shaft 50 when coils 246 and 248 are deenergized.

When coil 246 is energized or turned on, pilot clutch 228 is brought into frictional engagement with housing 244 of electromagnet 242, thereby retarding or preventing the rotation of pilot clutch 228. It is noted that either pilot clutch 228 or housing 244, or both, may include a coating, generally indicated at 250, having a high coefficient of friction which enhances the retardation of pilot clutch 228. It is noted that similar coatings 250 may be applied to either or both pilot clutch 230 and the corresponding portion of housing 244. Consequently, when coil 246 is energized so as to retard or prevent the rotation of pilot clutch 228, clutch hub 202 of main clutch 82 rotates faster than sleeve member 208. This occurs, because clutch hub 202 continues to rotate with output shaft 50, while member 208 rotates slower than shaft 50 due to the connection of member 208 to pilot clutch 228. When clutch hub 202 overruns sleeve member 208, the engagement of ramp surfaces of 212 and 214 with one another causes sleeve member 208 to be displaced axially aft relative to clutch hub 202 or to the right in FIG. 8. Sleeve member 208 is coupled to a pressure plate connecting member 252 via thrust bearing 254. Connecting member 252 includes a plurality of circumferentially spaced and axially extending arms 255 which pass through corresponding circumferentially spaced slots 256 in clutch hub 202 and are attached to annular pressure plate 258. Pressure plate 258 is secured to arms 255 by snap ring 260 or alternatively by bolts or other conventional fasteners. Accordingly, when sleeve member 208 moves to the right in FIG. 8, or axially aft relative to clutch hub 202, pressure plate 258 is also caused to move axially aft thereby loading, or engaging, the four-wheel drive clutch 82 of torque transfer case 13.

When coil 248 is energized, pilot clutch 230 is grounded to housing 244 of electromagnet 242, so as to retard or prevent the rotation of pilot clutch 230. This retards or prevents the rotation of side gear 220 which in turn causes forward side gear 222 and coupled sleeve member 208 to rotate faster than output shaft 50 and consequently to rotate faster than clutch hub 202. This relative rotation between member 208 and clutch hub 202 causes sleeve member 208 to move axially forward relative to hub 202 due to the engagement of ramp surfaces 212 and 214 with one another which causes pressure plate 258 to move axially forward so as to unload, or disengage, four-wheel drive clutch 82. Again it is noted that the foregoing discussions pertain to a given direction of rotation of output shaft 50 corresponding to a forward or aft direction of vehicle operation. If shaft 50 is rotated in an opposite direction the loading and unloading roles of pilot clutches 228 and 230, respectively, would be reversed. Further, it should be understood that coils 246 and 248 of electromagnet 242 are never energized at the same time and accordingly that pilot clutches 228 and 230 are never concurrently grounded.

Figure 11:
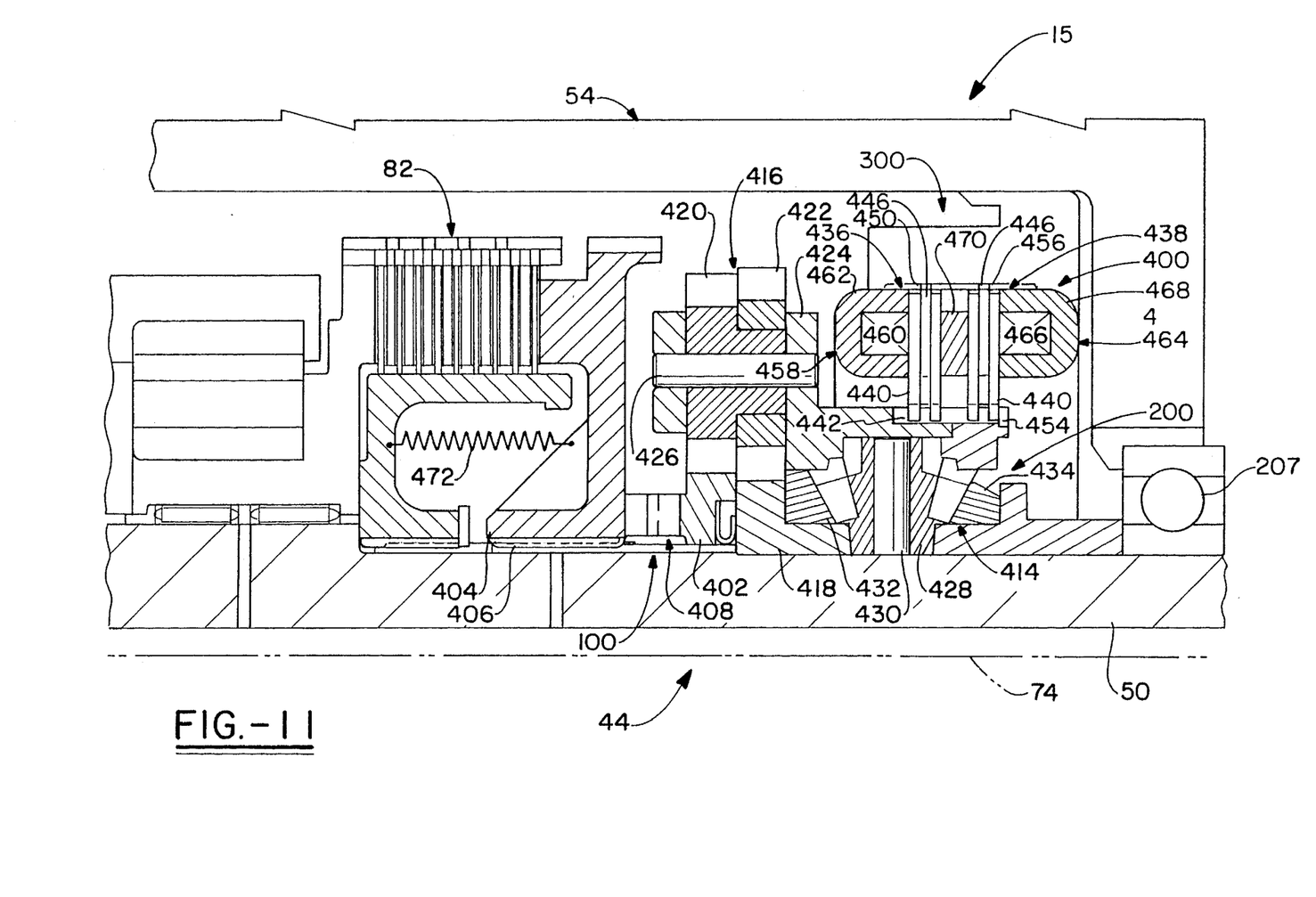
FIG. 11 is a partial cross-sectional view illustrating still another torque transfer case incorporating the clutch actuating device according to another preferred embodiment of the present invention, with the portion of the transfer case shown being depicted above the rotational centerline of the rear output shaft of the transfer case.

FIG. 11 is a partial cross-sectional view illustrating a portion of another torque transfer case 15 with the portion shown being depicted above centerline axis 74 of rear output shaft 50. Transfer case 15 incorporates the clutch actuating device 44 according to another preferred embodiment. The actuator mechanism 100 comprises a first rotating member 402 which is rotatably mounted about shaft 50, and a second rotating member comprising pressure plate 404 which is splined to shaft 50 at 406 and rotates therewith. Pressure plate 404 is disposed axially adjacent to clutch 82. Splined connection 406 permits limited axial movement of pressure plate 404 along shaft 50. Rotating member 402 and pressure plate 404 each include an axially facing ramp, or cam surface, which engage one another as indicated generally at 408 so as to permit axial translation of pressure plate 404 relative to rotating member 402 for the purpose of loading clutch 82 of torque transfer case 15. The ramp surface of rotating member 402 engages the ramp surface of pressure plate 404 similar to that shown in FIG. 9, so as to produce axial translation of pressure plate 404 relative to rotating member 402 in response to relative rotation between member 402 and pressure plate 404.

Gear means 200 comprises a bevel gear set indicated generally at 414. Clutch actuating device 44 may optionally include a planetary reduction gear set, indicated generally at 416, which is incorporated for torque multiplication purposes so as to reduce the control torque which must be applied to engage clutch 82 and to ensure that the vehicle does not slow down when clutch 82 is engaged. As an example, a torque multiplication of approximately 10 to 1 may be achieved by planetary gear set 416. However, it should be understood that the intended function of clutch actuating device 44 may be achieved without including planetary gear set 416. Bevel gear set 414 includes a pinion gear 428 which is secured to output shaft 50 by one or more pins 430 for rotation with shaft 50. Bevel gear set 414 further includes first and second bevel side gears 432 and 434, respectively. Side gear 432 is attached to a planet carrier 424 of the planetary gear set 416. Planetary gear set 416 includes a sun gear 418 which is mounted to output shaft 50 and is restricted from rotation relative to shaft 50. Planetary gear set 416 further includes first and second pluralities of circumferentially spaced planet cluster gears 420 and 422, respectively. Planet gears 420 and 422 are rotatably mounted on carrier 424 by pins 426. Carrier 424 is attached to side gear 432 or is manufactured as an integral part thereof.

Pilot clutch means 300 comprises a first pilot clutch indicated generally at 436, and a second pilot clutch indicated generally at 438. Pilot clutches 436 and 438 may be similar in construction to pilot clutches 140 and 142 of the embodiment of clutch actuating device 44 illustrated in FIG. 5. Pilot clutch 436 includes a first set of clutch plates 440 which are attached to carrier 424, for rotation therewith, via a splined connection 442. Clutch plates 440 include a plurality of circumferentially spaced and circumferentially extending slots (not shown) similar to those shown in FIG. 6. Pilot clutch 436 also includes a second set of plates 446 which are connected to a stationary support structure 448 of transfer case housing 54 via a splined connection 450. Similar to those shown in FIG. 7, plates 446 include a plurality of circumferentially spaced and circumferentially extending slots (not shown). Plates 440 and 446 of pilot clutch 436 are interleaved with one another, with each plate 440 being free to rotate about axis 74 of rear output shaft 50 with carrier 424 and each plate 446 being grounded to transfer case housing 54.

Pilot clutch 438 also includes a plurality of plates 440 which are connected to an outer portion of bevel side gear 434 via splined connections 454 and a plurality of plates 446 which are connected to transfer case support structure 448 via splined connections 456. As with pilot clutch 436, plates 440 and 446 of pilot clutch 438 are interleaved with one another. The pilot clutch activating means 400 includes a first electromagnet 458, having a coil 460 contained within a housing 462 which is grounded to transfer case housing 54, and a second electromagnet 464 having a coil 466 contained within housing 468 which is also grounded to transfer case housing 54. Activating means 400 further includes a shield plate 470 which is attached to transfer case housing 54 but is free to float axially and is used in conjunction with plates 440 and 446.

As described with reference to the embodiment of FIGS. 5–7, the slots in plates 440 cooperate with the slots of plates 446 such that when either coil 460 or coil 466 is energized, the magnetic field generated will form a flux path which starts at one pole of the corresponding electromagnet 458 or 464, respectively, and travels through corresponding ones of plates 440 and 446 until the field is stopped by floating shield plate 470. The field is then forced to wrap around and return to the opposite pole of the corresponding one of electromagnets 458 and 464. The positioning of slotted plates 440 and 446 in pilot clutches 436 and 438 allows the magnetic fields of electromagnets 458 and 464 to act upon each adjacent pair of plates 440 and 446 separately to activate the corresponding pilot clutch.

In operation, energizing coil 460 causes adjacent ones of slotted plates 440 and 446 of pilot clutch 436 to be attracted to one another, so as to ground plates 440 to transfer case housing 54. Accordingly, the rotation of carrier 424 is retarded or prevented so that carrier 424 rotates slower than, or underruns shaft 50. Rotating member 402, which is coupled to planetary gear set 416, is also caused to underrun shaft 50, which creates relative rotation between member 402 and pressure plate 404 which continues to rotate with shaft 50. The relative rotation produced between member 402 and pressure plate 404, causes engagement of the respective ramp surfaces with one another to thereby cause pressure plate 404 to translate axially relative to member 402 such that pressure plate 404 contacts clutch 82, thereby loading or engaging clutch 82. Alternately, energizing coil 466 of electromagnet 464 causes adjacent ones of slotted plates 440 and 446 of pilot clutch 438 to be attracted to one another, thereby grounding plates 440 of pilot clutch 438 to transfer case housing 54. Accordingly, when pilot clutch 438 is activated so as to ground plates 440, bevel side gear 434 rotates slower than output shaft 50 which in turn causes carrier 424 and rotating member 402 to rotate faster than, or overrun, shaft 50. The resulting relative rotation between pressure plate 404 and rotating member 402, coupled with the engagement of ramp surfaces 412 and 410 with one another causes pressure plate 404 to move away from clutch 82 so as to unload or disengage clutch 82. This movement of pressure plate 404 away from clutch 82 may be assisted by return spring 472 which is compressed when clutch 82 is engaged. As with the previous embodiments of the clutch actuating device 44, the foregoing discussion corresponds to a given direction of rotation of shaft 50 and a corresponding direction of motion of the associated vehicle (not shown) and the engaging and disengaging roles of pilot clutches 436 and 438 would be reversed for an opposite direction of rotation of shaft 50.

In this embodiment, the torque multiplication provided by planetary gear set 416 increases the torque applied to the ramp of rotating member 402 to thereby apply more force on main clutch 82 with less torque on the pilot clutch means 300. Reducing torque on the pilot clutch means 300 is desirable so as not to affect vehicle operation upon activation of either of pilot clutches 436 and 438. The torque relationship between the pilot clutch means 300 and main clutch 82 may be adjusted in any manner for a particular vehicle.

The clutch actuating device of the present invention may be used in conjunction with vehicle drivetrain subassemblies other than torque transfer cases. This is shown in FIG. 12 which illustrates a portion of a vehicle drivetrain subassembly 17 which incorporates the clutch actuating device 44 of the present invention which is used to engage and disengage a primary vehicle clutch 301. Subassembly 17 includes a vehicle flywheel 302 receiving torque from an engine (not shown) and a transmission input shaft 304 which are both rotatable about centerline axis 306. Flywheel 302 and transmission input shaft 304 are rotatably connected to one another when clutch 301 is engaged and are disconnected from one another when clutch 301 is disengaged. Clutch 301 includes an inner portion 308 which is connected to shaft 304 via splines 310 in a manner which permits limited axially displacement of clutch 301 relative to shaft 304. Clutch 301 further includes an outer member 312 which is fastened to inner member 308 by conventional means such as rivets 314. Outer member 312 includes friction plates 316 which are utilized in a subsequently discussed manner when clutch 301 is engaged.

The actuator mechanism 100 of clutch actuating device 44 includes an outer rotating sleeve member 319 which includes an inner threaded screw member 320 and an outer flange portion 322 which is fixedly attached to inner member 320 by conventional means such as rivets 324. Outer flange portion 322 is fixedly attached to fly-wheel 302 by conventional means such as bolts 326, thereby coupling rotatable member 319 to flywheel 302 for rotation therewith. Actuation device 44 further includes an inner rotating sleeve member 321 which is rotatably mounted about shaft 304 by bearing assemblies 329 or other conventional means. The inner portion 320 of member 319 includes internal threads 330 which engage external threads 332 formed on inner rotating sleeve member 321 so as to form a linear screw arrangement which is used to axially translate member 321 relative to member 319 as subsequently discussed. The differential gear set 200, comprises a planetary gear set, indicated generally at 335, which includes a planet carrier 336 which is fixedly attached to the outer flange portion 322 of rotating member 319 by conventional means. A plurality of circumferentially spaced planet gears 340 are individually rotatably mounted on planet carrier 336. Each planet gear 340 meshingly engages a ring gear 342 and a sun gear 344. Ring gear 342 is splined to inner rotating sleeve member 321 via splines 346 and sun gear 344 is mounted to member 321 in a slip fit and therefore is free to rotate at the same speed as flywheel 302 until restricted as subsequently discussed.

Actuating device 44 further includes a first pilot clutch 351 comprising a rotatable plate which is splined to sun gear 344 and a second pilot clutch 353 comprising a rotatable plate splined to inner rotating sleeve member 321. Pilot clutches 351 and 353 may alternatively comprise a plurality of plates with each plate being splined to sun gear 344 and inner sleeve member 321, respectively. Activating means 400 are provided for activating pilot clutches 351 and 353 comprising first and second electromagnets 352 and 354, having coils 366 and 362, respectively, which are contained within housings 355 and 357, respectively. Housings 355 and 357 which are each grounded to a stationary structure of subassembly 17, armature plates 356 and 358 and reaction plate 360 which is grounded to a stationary structure of subassembly 17. Armature plates 356 and 358 are interconnected by a plurality of circumferentially spaced screws 361 and associated sleeve members 363. As shown in FIG. 12, pilot clutch 351 is disposed axially between reaction plate 360 and armature plate 356, and pilot clutch 353 is disposed axially between reaction plate 360 and armature plate 358.

In operation, energizing coil 362 of electromagnet 354 attracts armature plate 358 which in turn causes pilot clutch 351 to be compressed between armature plate 356 and reaction plate 360, thereby grounding pilot clutch 351 to the stationary structure of drivetrain subassembly 17. Grounding pilot clutch 351 retards or prevents the rotation of sun gear 344 which in turn causes ring gear 342 to rotate faster than, or overrun flywheel 302. Accordingly, inner rotating sleeve member 321 overruns outer rotating sleeve member 319. Due to the linear screw arrangement formed by threads 330 of outer member 319 and threads 332 of inner member 321, inner sleeve member 321 is translated axially to the left in FIG. 12. When this occurs, inner sleeve member 321 forces pressure plate 364, which is attached at an inner portion to inner sleeve member 321, against plates 316 of primary vehicle clutch 301 so that plates 316 are compressed between pressure plate 364 and flywheel 302, thereby loading or engaging primary clutch 301. Energizing a coil 366 of electromagnet 352 attracts armature plate 356 which in turn causes pilot clutch 353 to be compressed between armature plate 358 and reaction plate 360, thereby grounding pilot clutch 353 to the stationary structure of drivetrain subassembly 17. Grounding pilot clutch 353 causes ring gear 342 to rotate slower than, or underrun, flywheel 302 and also causes inner rotating sleeve member 321 to underrun outer rotating sleeve member 319. Accordingly, inner sleeve member 321 is translated axially away from primary clutch 301, or to the right in FIG. 12, thereby unloading or disengaging clutch 301. It should be understood that the foregoing discussion with regard to the operation of clutch actuating device 44 corresponds to a given direction of rotation of flywheel 302 and a corresponding direction of motion of the associated vehicle (not shown), and that for an opposite direction of rotation of flywheel 302 the engaging or loading and disengaging or unloading roles of pilot clutches 351 and 353, respectively, are reversed.

While the foregoing description has set forth the preferred embodiments of the invention in particular detail, it must be understood that numerous modifications, substitutions and changes can be undertaken without departing from the true spirit and scope of the present invention as defined by the ensuing claims. For instance while various embodiments of the clutch activating device have been illustrated in an "on-demand" type torque transfer case and for use with a primary vehicle clutch, the clutch activating device may be used in other vehicle drivetrain subassemblies such as a "full-time" four-wheel drive torque transfer case or a vehicle differential. The invention is therefore not limited to specific preferred embodiments as described but is only limited by the following claims.

What is claimed is:

1. A clutch actuating device for use in a vehicle drivetrain subassembly having a clutch, said clutch actuating device comprising:

a first rotating member which is coupled to a rotatable drive member of the vehicle drivetrain subassembly for rotation therewith;

a second rotating member which is free to rotate relative to the drive member, said first and second rotating members engaging one another so as to cause axial translation of said second member relative to said first member in response to relative rotation between said first and second members;

gear means connected to at least one of said first and second rotating members for differentially driving said first and second rotating members;

first and second pilot clutches, each of said pilot clutches comprising at least one rotatable plate, wherein said at least one rotatable plate of at least one of said first and second pilot clutches is connected to said gear means;

means for selectively activating said first pilot clutch and said second pilot clutch so as to selectively ground said first and second pilot clutches, wherein activating one of said first and second pilot clutches causes said second rotating member to translate axially relative to said first rotating member so as to load the drivetrain subassembly clutch, and wherein activating the other of said first and second pilot clutches causes said second rotating member to translate axially relative to said first rotating member so as to unload the drivetrain subassembly clutch.

2. The clutch actuating device as recited in claim 1, wherein said first and second rotating members have first and second ramp surfaces, respectively, said first and second ramp surfaces engaging one another so as to permit axial translation of said second rotating member relative to said first rotating member.

3. The clutch actuating device as recited in claim 1, wherein said first and second rotating members comprise first and second rotating sleeve members, respectively, wherein said first and second rotating sleeve members are threaded screw members which engage one another in a linear screw arrangement so as to permit axial translation of said second rotating sleeve member relative to said first rotating sleeve member.

4. The clutch actuating device as recited in claim 2, wherein said first and second ramp surfaces comprise single directional ramp surfaces.

5. The clutch actuating device as recited in claim 1, wherein said gear means comprises a planetary gear set which includes a planet carrier coupled to the rotatable drive member of the vehicle drivetrain subassembly for rotation therewith, a plurality of planet gears mounted on the planet carrier, a ring gear and a sun gear.

6. The clutch actuating device as recited in claim 5, wherein:

said first and second rotating members comprise first and second rotating sleeve members, respectively;

said planet carrier is attached to said first rotating sleeve member for rotation therewith;

said ring gear is integral with said second rotating sleeve member for rotation therewith;

said sun gear is rotatably mounted to the rotatable drive member.

7. The clutch actuating device as recited in claim 6, wherein:

said at least one plate of said first pilot clutch is splined to said ring gear;

said at least one plate of said second pilot clutch is splined to said sun gear;

activating said first pilot clutch so as to ground said at least one plate of said first pilot clutch produces relative rotation between said first and second rotating sleeve members causing said second rotating sleeve member to translate axially relative to said first rotating sleeve member so as to load the drivetrain subassembly clutch for a first direction of rotation of the drive member of the drivetrain subassembly, and wherein activating said first pilot clutch causes said second rotating sleeve member to translate axially relative to said first rotating sleeve member so as to unload the drivetrain subassembly clutch for a second direction of rotation of the drive member, the second direction of rotation being opposite to the first direction of rotation;

activating said second pilot clutch so as to ground said at least one plate of said second pilot clutch produces relative rotation between said first and second rotating sleeve members which causes said second rotating sleeve member to translate axially relative to said first rotating sleeve member so as to unload the drivetrain subassembly clutch for the first direction of rotation of the drive member, and wherein activating said second pilot clutch causes said second rotating sleeve member to translate axially relative to said first rotating sleeve member so as to load the drivetrain subassembly clutch for the second direction of rotation of the drive member.

8. The clutch actuating device as recited in claim 5, wherein:

said planet carrier is fixedly attached to said first rotating member for rotation therewith;

said ring gear is drivingly connected to said second rotating member;

said sun gear is rotatably mounted to said second rotating member;

said first rotating member includes an inner threaded screw member which engages threads formed on said second rotating member so as to form a linear screw arrangement.

9. The clutch actuating device as recited in claim 8, wherein:

said at least one plate of said first pilot clutch is splined to said sun gear;

said at least one plate of said second pilot clutch is splined to said second rotating member;

wherein activating said first pilot clutch causes said second rotating member to translate axially relative to said first rotating member so as to load the drivetrain subassembly clutch for a first direction of rotation of the drive member, and wherein activating said first pilot clutch causes said second rotating member to translate axially relative to said first rotating member so as to unload the drivetrain subassembly clutch for a second direction of rotation of the drive member, the second direction of rotation being opposite to the first direction of rotation:

wherein activating said second pilot clutch causes said second rotating member to translate axially relative to said first rotating member so as to unload the drivetrain subassembly clutch for the first direction of rotation of the drive member, and wherein activating said second pilot clutch causes said second rotating member to translate axially relative to said first rotating member so as to load the drivetrain subassembly clutch for the second direction of rotation of the drive member.

10. The clutch actuating device as recited in claim 1, wherein said activating means comprises:

a reaction plate fixed to a housing of the drivetrain subassembly and disposed axially between said first pilot clutch and said second pilot clutch;

first and second armature plates disposed axially adjacent said first and second pilot clutches, respectively, so that said first pilot clutch is disposed axially between said first armature plate and said reaction plate and said second pilot clutch is disposed axially between said second armature plate and said reaction plate;

first and second electromagnets disposed axially adjacent said first and second armature plates, respectively;

wherein energizing a coil of said first electromagnet causes said at least one rotatable plate of said second clutch to be urged against said reaction plate thereby grounding said second pilot clutch and wherein energizing a coil of said second electromagnet causes said at least one rotatable plate of said first pilot clutch to be urged against said reaction plate thereby grounding said first pilot clutch.

11. The clutch actuating device as recited in claim 1, wherein said gear means comprises a bevel gear set which includes a pinion gear and first and second bevel side gears.

12. The clutch actuating device as recited in claim 11, wherein said pinion gear is pinned to the rotatable drive member of the vehicle drivetrain subassembly for rotation therewith and said first and second bevel side gears engage the rotatable drive member in a slip fit so that said first and second bevel side gears are free to rotate relative to the drive member.

13. The clutch actuating device as recited in claim 12, wherein:

said at least one rotatable plate of said first pilot clutch is connected to said first bevel side gear;

said at least one rotatable plate of said second pilot clutch is connected to said second bevel side gear and said second rotating member; and said first rotating member comprises a clutch hub of the vehicle drivetrain subassembly clutch and said second rotating member is a rotating sleeve member.

14. The clutch actuating device as recited in claim 1, wherein said means for selectively activating said first and second pilot clutches comprises an electromagnet having first and second coils which are concentric with one another.

15. The clutch actuating device as recited in claim 1, wherein said first pilot clutch comprises a plurality of rotatable plates connected to said gear means and said second pilot clutch comprises a plurality of rotatable plates connected to said gear means.

16. The clutch actuating device as recited in claim 15, wherein each of said rotatable plates of said first and second pilot clutches include a plurality of circumferentially spaced and circumferentially extending slots.

17. The clutch actuating device as recited in claim 1, wherein said first rotating member comprises a pressure plate which is splined to the rotatable drive member of the vehicle drivetrain subassembly and is disposed axially adjacent to the clutch of the drivetrain subassembly.

18. The clutch actuating device as recited in claim 17, wherein:

said pressure plate includes a first axially facing ramp surface which engages a second axially facing ramp surface attached to said second rotating member, said first and second ramp surfaces engage one another so as to cause said pressure plate to translate axially relative to said second rotating member in response to relative rotation between said pressure plate and said second rotating member.

19. The clutch actuating device as recited in claim 18, wherein:

said gear means comprises a bevel gear set which is coupled to a planetary gear set; and said planetary gear set is drivingly connected to said second rotating member.

20. The clutch actuating device as recited in claim 19, wherein a first one of said first and second pilot clutches is connected to a planet carrier of said planetary gear set and the other of said first and second pilot clutches is connected to a bevel side gear of said bevel gear set.

21. The clutch actuating device as recited in claim 13, wherein:

said rotating sleeve member is coupled to a pressure plate connecting member via a thrust bearing;

said pressure plate connecting member includes a plurality of circumferentially spaced and axially extending arms which pass through corresponding ones of a plurality of circumferentially spaced slots in said clutch hub; and said clutch actuating device further comprises a pressure plate which is secured to said arms of said pressure plate connecting member.

\* \* \* \* \*